2,993,381
HYDRO-INDICATOR
Walter E. Smith, R.D. 4, Salem, Ohio, assignor of fifty percent to Lloyd W. Cyphert, Salem, Ohio
Filed Dec. 10, 1957, Ser. No. 701,801
2 Claims. (Cl. 73—438)

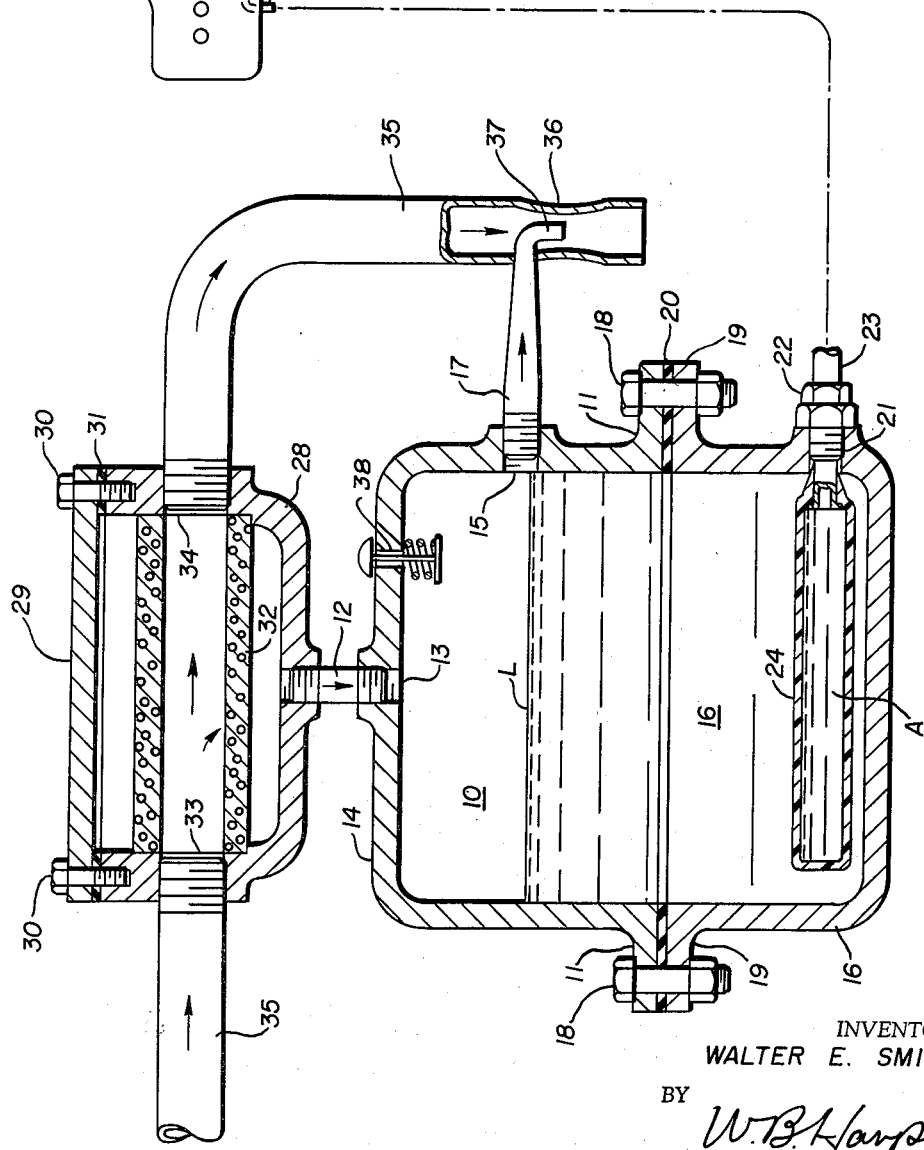
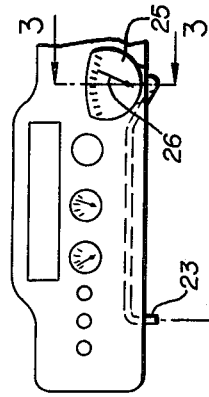
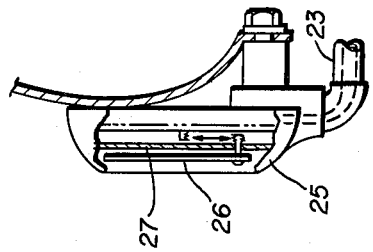
July 25, 1961     W. E. SMITH     2,993,381
HYDRO-INDICATOR
Filed Dec. 10, 1957
INVENTOR.
WALTER E. SMITH
BY
W. B. Harpman
ATTORNEY

# United States Patent Office 2,993,381
Patented July 25, 1961

This invention relates to an indicator and more particularly to an apparatus for indicating the amount of one fluid in a solution of another fluid, for example, the amount of alcohol in a solution of water or the amount of ethylene glycol in water.

The principal object of the invention is the provision of a hydro-indicator which will function at a given working temperature through the vaporization of a readily evaporable liquid and operate to indicate the amount of one liquid in another or the density of the solution.

As applied to liquid-cooled internal combustion engines, the hydro-indicator will continuously indicate, after the engine has reached operating temperatures, the percentage of anti-freeze in the cooling liquid. As applied to soft drink beverage blending apparatus, the device will operate at a predetermined temperature to indicate the amount of syrup and/or sweetening in the blend to be bottled.

The invention contemplates the use of a highly volatile medium for sensing the change in weight of a given quantity of the solution being tested and the utilization of the vapor pressure medium renders the device extremely sensitive and accurate.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a cross sectional elevation of the hydro-indicator, arrows indicating the flow of a solution to be tested and broken lines indicating a tubular connection between the respective parts.

FIGURE 2 is a plan view of an instrument panel on a reduced scale incorporating a part of the hydro-indicator.

FIGURE 3 is an enlarged vertical section taken on line 3—3 of FIGURE 2.

By referring to the drawing and FIGURES 1, 2 and 3 in particular it will be seen that the hydro-indicatro comprises a housing 10 having apertured mounting flanges 11—11 thereon by means of which it may be mounted on a suitable support of, for example, an automobile vehicle.

A tube 12 communicates with an inlet port 13 in the housing 10. The inlet opening in the housing 10 is located in the top 14 thereof, and an outlet opening 15 is located intermediate the top 14 of the housing 10 and a bottom cap 16. A tube 17 communicates with the outlet opening 15 and acts to maintain a liquid level at L.

The cap 16 is secured to the housing 10 by fasteners 18 positioned through apertured flanges 19, a gasket 20 being positioned intermediate the flanges 11 and 19. The cap 16 is provided with an outlet opening 21 in which a threaded fitting 22 of the compression type is engaged and which serves to effect a seal with respect to a conduit 23 passing therethrough. An airvent 38 is provided.

The conduit 23 communicates at its inner end with a flexible bellows 24 and at its opposite end with a gauge 25 incorporating means for translating vapor pressure into mechanical movement whereby a hand 26 may be moved with respect to a dial 27.

The housing 10 will thus be seen to be closed by the cap 16 in which the bellows 24 is disposed and the bellows 24 is filled with a readily vaporized liquid such as wood alcohol A in an amount which, when vaporized, will fill the bellows, the conduit 23 and diaphragm case, etc., in the gauge 25.

The tube 12 through which fluid to be tested is introduced into the apparatus also communicates with a secondary housing 28. The secondary housing 28 is provided with a cap 29 secured thereto by fasteners 30 and which cap and housing are spaced by a suitable gasket 31. Within the secondary housing 28 a porous filter element 32 is positioned which is tubular and communicates with inlet and outlet openings 33 and 34 formed in the housing 28.

A pipe 35 supplies liquid to be tested to the filter 32 and hence by way thereof and by way of the pipe 12 to the housing 14. The pipe 35 extends from the other side of the secondary housing 28 and preferably forms a part of a closed circuit in communication with the liquid to be tested, for example, the coolant in an automotive vehicle radiator.

A portion of the pipe 35 is formed with a collar 36 so as to define a venturi with respect to a smaller downturned end portion 37 of the pipe 17. Thus, flow of liquid through the pipe 35 will supply the fluid to the housing 14 for testing and maintain the desired liquid level at L therein by reason of the venturi action just described.

In operation, it will be assumed that the housing 10 holds a pint of fluid and it will be recognized that if the fluid is pure water, it will weigh approximately fifteen ounces, if the fluid is one-quarter alcohol and three-quarters water, it will weight fourteen ounces, and if the fluid is one-half alcohol and one-half water, it will weigh thirteen and one-half ounces.

It will also be recognized that the wood alcohol in the bellows 24 will evaporate at 150° F. and the device will, therefore, become operative when the temperature of the fluid in the housing 10 reaches 150° F. At such time, the vapor pressure in the bellows 24, the conduit 23 and the gauge 25 accurately indicates the weight of the pint of fluid in the housing 10, and by calibrating the dial 27 plus or minus, the known weight of the solution variations in the amount of one of the fluids of the solution can be readily determined and indicated.

If permanent anti-freeze is utilized in the unit, the bellows 24, conduit 23 and gauge 25 are filled with benzene which vaporizes at 175° and the apparatus becomes operable at such temperature.

It will be observed by those skilled in the art that the gauge 25 will accurately indicate the minute changes in weight as they vary from zero to one and one-half ounces differential thereby providing a positive and accurate indication of the amount of the alcohol or permanent anti-freeze in the solution concerned.

It will occur to those skilled in the art that the construction of the apparatus herein disclosed is such that the gauge 25 and the bellows 24 can be supplied as a unit, filled with alcohol or benzene, and that they may be interchanged with the remainder of the apparatus at will and that the device will function for its intended purpose accurately and in a trouble-free manner.

It will occur to those skilled in the art that in the case of the two examples hereinbefore given, that of an automobile and a soft drink bottling machine application, more or less uniform operating temperatures are normal. In the case of the automobile, the normal thermostatic control of the cooling system in the automobile maintains the temperature at the predetermined temperature at which the device of this invention is established, as noted in the specification hereinbefore.

In the case of the soft drink bottling operation, a predetermined temperature is always established and is usually that which the syrup most readily blends with the water and flavoring means being employed.

Thus, in both of the examples, the invention will operate in the manner disclosed as it is not subject to temperature fluctuations which would contribute to irregularity in the absence of accurate temperature control.

It will thus be seen that the objects of the invention are met by the hydro-indicator disclosed herein.

Having thus described my invention, what I claim is:

1. A hydro-indicator comprising a housing having a detachable cap forming one wall of said housing, said housing having inlet and outlet openings in its side walls, the inlet openings being above the outlet opening, a pipe containing a source of fluid to be tested in communication with said inlet opening and having a secondary section extending therebeyond, a venturi section in said secondary section of said pipe, a secondary pipe in communication with said outlet opening and extending into and terminating within said secondary section of said pipe, means on said housing for mounting the housing on a supporting surface, a compressible hollow member in said housing in communication with a conduit exteriorly of said housing and a gauge in communication with said conduit, said hollow member, conduit and gauge being filled with a vaporizable fluid whereby variations in the weight of fluid disposed in the housing may be transmitted by the vaporizable fluid in the hollow member and conduit to said gauge.

2. A hydro-indicator comprising a container having an inlet opening and an outlet opening and arranged to contain a known quantity of solution to be tested, a compressible bellows disposed in the bottom of said container, a conduit in communication with said bellows and extending exteriorly of said container, a pressure operated gauge in communication with said conduit, a fluid substance in said bellows, conduit and gauge and means for introducing a given quantity of a solution to be tested into said container and removing the same therefrom, said means comprising a pipe containing a source of fluid to be tested in communication with said inlet opening and having a secondary section extending therebeyond, a venturi section in said secondary section of said pipe, a secondary pipe in communication with said outlet opening and extending into and terminating within said secondary section of said pipe.

References Cited in the file of this patent

UNITED STATES PATENTS

| | | |
|---|---|---|
| 2,303,640 | Hogg | Dec. 1, 1942 |
| 2,357,639 | Elias | Sept. 5, 1944 |
| 2,484,279 | Folz | Oct. 11, 1949 |